United States Patent
Ito et al.

(10) Patent No.: US 9,185,916 B2
(45) Date of Patent: Nov. 17, 2015

(54) METHOD OF PROCESSING WHEAT FLOUR, PROCESSED WHEAT FLOUR OBTAINED BY THE METHOD AND FOOD UTILIZING THE PROCESSED WHEAT FLOUR

(75) Inventors: Masanori Ito, Saitama (JP); Kazuhiro Sano, Saitama (JP); Takahiro Kitamura, Saitama (JP); Koji Murakami, Chiba (JP); Toshiyuki Koyama, Kanagawa (JP)

(73) Assignee: LOTTE CO., LTD, Tokyo (JP)

( * ) Notice: Subject to any disclaimer, the term of this patent is extended or adjusted under 35 U.S.C. 154(b) by 1160 days.

(21) Appl. No.: 11/665,338

(22) PCT Filed: May 6, 2005

(86) PCT No.: PCT/JP2005/008340
§ 371 (c)(1),
(2), (4) Date: Jan. 8, 2008

(87) PCT Pub. No.: WO2006/040853
PCT Pub. Date: Apr. 20, 2006

(65) Prior Publication Data
US 2008/0095916 A1    Apr. 24, 2008

(30) Foreign Application Priority Data
Oct. 13, 2004 (JP) ................. 2004-299432

(51) Int. Cl.
| | | |
|---|---|---|
| *A21D 2/14* | (2006.01) | |
| *A21D 6/00* | (2006.01) | |
| *A21D 13/08* | (2006.01) | |
| *A23L 1/015* | (2006.01) | |
| *A23L 1/10* | (2006.01) | |
| *A23L 1/16* | (2006.01) | |

(52) U.S. Cl.
CPC .. *A21D 2/14* (2013.01); *A21D 6/00* (2013.01); *A21D 13/08* (2013.01); *A23L 1/0152* (2013.01); *A23L 1/1041* (2013.01); *A23L 1/16* (2013.01)

(58) Field of Classification Search
CPC ...................................................... A21D 2/14
USPC .................. 426/472, 622, 531, 618, 615, 463
See application file for complete search history.

(56) References Cited

U.S. PATENT DOCUMENTS

| | | | | |
|---|---|---|---|---|
| 2,198,200 | A | * 4/1940 | Musher | ........................ 426/542 |
| 2,422,588 | A | * 6/1947 | Samisch | ........................ 426/577 |
| 4,232,015 | A | 11/1980 | Teutsch et al. | |
| 5,084,288 | A | 1/1992 | Yamamoto et al. | |
| 5,352,473 | A | 10/1994 | Chiqurupati et al. | |
| 5,972,668 | A | * 10/1999 | Georg et al. | ................... 435/188 |
| 6,063,427 | A | 5/2000 | Watanabe | |

FOREIGN PATENT DOCUMENTS

| | | | | |
|---|---|---|---|---|
| DE | 31 33 471 | | 3/1983 | |
| EP | 784 931 | | 7/1997 | |
| GB | 2 002 222 | | 2/1979 | |
| GB | 2002222 | | 3/1979 | |
| GB | 2002222 | * | 8/1979 | ............... A21D 2/14 |
| JP | 4640746 | | 12/1971 | |
| JP | 54-32642 | | 3/1979 | |
| JP | 54032642 | A | 3/1979 | |
| JP | 5636898 | | 8/1981 | |
| JP | 5643332 | | 10/1981 | |
| JP | 5650546 | | 11/1981 | |
| JP | 57105153 | | 6/1982 | |
| JP | 62096034 | | 5/1987 | |
| JP | 62181747 | | 8/1987 | |
| JP | 05244856 | | 9/1993 | |
| JP | 10056948 | | 3/1998 | |
| JP | 2997082 | | 2/2008 | |
| JP | 62032849 | | 2/2008 | |
| WO | WO2004/037002 | * | 6/2004 | ............... A21D 6/00 |

OTHER PUBLICATIONS

Whole Grain Foods and Heart Disease Risk, Feb. 2000.*
AirPressure NPL, Apr. 27, 2002, http://www.mcgillairpressure.com/vac/textdocs/aboutus.html, McGill Airpressures LLC.*

* cited by examiner

*Primary Examiner* — Drew E Becker
*Assistant Examiner* — Preston Smith
(74) *Attorney, Agent, or Firm* — Pillsbury Winthrop Shaw Pittman, LLP

(57) ABSTRACT

A method of processing wheat flour that without detriment to secondary processability, improves the flavor and palate feelings thereof; processed wheat flour obtained by the processing method; and food utilizing the processed wheat flour. The method is characterized in that 10 to 55 pts·wt. of ethyl alcohol is homogeneously dispersed in 100 pts·wt. of wheat flour under such conditions that the total water content is ≤20 wt. %, followed by evaporation of ethyl alcohol therefrom at ≤50° C.

6 Claims, No Drawings

METHOD OF PROCESSING WHEAT FLOUR, PROCESSED WHEAT FLOUR OBTAINED BY THE METHOD AND FOOD UTILIZING THE PROCESSED WHEAT FLOUR

CROSS-REFERENCE TO RELATED APPLICATIONS

This application is the U.S. national stage application to International Patent Application No. PCT/JP2005/008340, filed May 6, 2005, which claims priority to Japanese Patent Application No. 2004-299432, filed Oct. 13, 2004, and are being incorporated by reference herein in their entireties.

BACKGROUND OF THE INVENTION

1. Field of the Invention

The present invention relates to a method of processing wheat flour that without detriment to processability, may improve the palate feelings and flavor thereof; processed wheat flour obtained by the processing method; and food utilizing the processed wheat flour.

Wheat flour is widely utilized in the filed of food as main raw material of breads, noodles, confectioneries (cookies, biscuits, cakes, pies, pretzels and the like) and snacks.

Any of the mentioned foods are made mainly from wheat flour, for which reason the quality of wheat flour greatly affects the palate feelings of foods. There is an issue that the mentioned foods have wheat flour-specific powdery feelings and poor meltability. Wheat flour-specific protein or gluten is an ingredient taking a major role in secondary processability of wheat flour, and therefore, it is an essential ingredient to make the mentioned foods. On the other hand, however, it is a hydrophobic protein, which likely generates powdery feelings and the like.

2. Description of Related Art

On the other hand, as for a method of alcohol treatment of foods, the treatments of nuts, rice, wheat flour bran and the like are known at present. In the conventional method of the treatment, it is essential, at the time of alcohol treatment or alcohol elimination, to involve high-temperature heating (e.g. Patent Reference 1), or to further use water (e.g. Patent Reference 2).

However, in case these methods are applied for wheat flour, there is an issue that gluten in wheat flour is deactivated by heating and secondary processability of wheat flour is lost, or wheat flour forms dough by addition of water to wheat flour and subsequently process to the other various forms becomes difficult and the intended improvement of palate feelings is not achieved.

As mentioned, the conventional method of alcohol treatment is intended not for the process of fine powder such as wheat flour but for the process of food materials whose fundamental nature and quality are less subject to addition of water and heat such as grainy cereals and the like. Further, the object is to improve odor of the subject and to concentrate the nutritive ingredient, for which reason the method is not applicable to the process of powder having wide range of secondary processability such as wheat flour.

Additionally, in recent years, the growth of health consciousness promotes desire to use whole grain wheat flour which is rich in nutritive value. However, whole grain flour is particularly poor in palate feelings and flavor, and specifically its odor is known to be derived from aldehydes mostly contained in the bran in whole grain wheat flour, for which reason the study to improve the flavor has been being conducted. The methods of improving the flavor of bran are known, such as a method of steaming bran and then adding acid and saccharide to the bran and drying it by heating (e.g., see Patent Reference 3), a method of adding water to bran and inoculating Koji mold into the bran to be cultivated (e.g., see Patent Reference 4), a method of soaking large bran of wheat flour in water, dehydrating and drying it by heating (e.g., see Patent Reference 5), a method of adding water to bran, reacting the bran with the ferment the bran itself has, and further adding heat and pressure to the bran (e.g., see Patent Reference 6).

However, these methods are limited to be applied for the bran isolated from wheat flour. In case these methods are applied for whole grain wheat flour, there is also an issue that gluten is deactivated or significantly transformed, for which reason secondary processability of the products made therefrom is destroyed and improvement of palate feelings is not achieved.

Patent Reference 1: Unexamined patent publication No. S56-43332
Patent Reference 2: Unexamined patent publication No. S56-36898
Patent Reference 3: Unexamined patent publication No. S56-50546
Patent Reference 4: Laid-open patent publication No. S57-105153
Patent Reference 5: Laid-open patent publication No. S62-32849
Patent Reference 6: Patent publication No. 2997082

BRIEF SUMMARY OF THE INVENTION

An object of the present invention is to provide a method of processing wheat flour that without detriment to secondary processability, improves the flavor and palate feelings thereof; processed wheat flour obtained by the processing method; and food utilizing the processed wheat flour.

BRIEF DESCRIPTION OF THE SEVERAL VIEWS OF THE DRAWING(S)

Not Applicable

DETAILED DESCRIPTION OF THE INVENTION

In order to solve the above mentioned issue, the present inventors and others devoted themselves to study and found that by using an improved method wherein 10 to 55 pts·wt. of ethyl alcohol is homogeneously dispersed in 100 pts·wt. of wheat flour under such conditions that the total water content is ≤20 wt. %, followed by evaporation of ethyl alcohol therefrom at ≤50° C., it is possible to obtain wheat flour that without detriment to secondary processability, improves the flavor and palate feelings thereof. Thus, the present invention was completed.

Additionally, it was found that, in the above mentioned method of processing, if evaporation of ethyl alcohol is carried out under reduced pressure, flavor and palate feelings may preferably be improved, and further, if wheat flour consists of whole grain flour, flavor of whole grain may prominently be improved, for which reason preferable processed wheat flavor may be obtained.

The present invention further relates to processed wheat flour obtained by the mentioned processing method.

The present invention furthermore relates to food utilizing the mentioned processed wheat flour.

According to the method of processing in the present invention, without detriment to secondary processability of wheat gluten, flour-specific unpreferable palate feelings such as poor meltability may greatly be improved and flavor may also be improved.

Further, if the method of processing in the present invention is applied for whole grain wheat flour, not only the palate feelings may be improved but also the whole grain flour-specific unfavorable bitterness and odor may be removed and flavor may also predominantly be improved.

In addition, if the food is made by utilizing the processed wheat flour obtained by the above mentioned method, the quality thereof is excellent in palate feelings such as feelings on the tongue, meltability, throat feelings and the like. Further, the quality is excellent since wheat flour-specific flour smell is completely removed.

THE BEST MODE FOR CARRYING OUT THE INVENTION

The preferred embodiments of the present invention are explained in detail as follows.

The wheat flours used in the present invention are wheat flours such as hard wheat flour, medium wheat flour, soft wheat flour, whole grain flour and the like. As for alcohol, in consideration of safety as food, boiling point and so on, ethyl alcohol is used.

The method of processing wheat flour in the present invention is, at first, 10 to 55 pts·wt. of ethyl alcohol (or ethyl alcohol excluding water, if aqueous ethyl alcohol is used) is homogeneously dispersed in 100 pts·wt. of wheat flour under such conditions that the total water content is ≤20 wt. %. A method of homogeneously dispersing ethyl alcohol in wheat flour may appropriately be selected from methods wherein wheat flour and ethyl alcohol may homogeneously be dispersed, such as a method of pouring ethyl alcohol into wheat flour agitated in a mixer and mixing, a method of quantitatively spraying mist-like ethyl alcohol on wheat flour falling through a sifter, a method of quantitatively dropping ethyl alcohol to a continuous mixer and the like.

Mixing ratio of wheat flour and ethyl alcohol in the present invention is, as mentioned, 10 to 55 pts·wt., and preferably 15 to 45 wt. % of ethyl alcohol, to 100 pts·wt. of wheat flour.

In case that mixing ratio of ethyl alcohol is ≥55 pts·wt., under the condition that wheat flour is dispersed in ethyl alcohol, the more evaporation of ethyl alcohol is difficult, the worse handling becomes, and a lump is formed, for which reason the processed wheat flour has less processability. Further, in case that mixing ratio of ethyl alcohol is ≤10 pts·wt., even if food is made from the processed wheat flour obtained, the feature of the present invention or the improvement of palate feelings may not be noted.

In the present invention, the water content when homogeneously dispersing the above mentioned wheat flour and ethyl alcohol is ≤20 wt. % and more preferably ≤13 wt. %. In case that water content is >20 wt. %, when ethyl alcohol is dispersed in wheat flour, a lump is formed inhomogeneously. Further, in the below-mentioned subsequent process of evaporating ethyl alcohol, a solid lump of dough still exists as hard as before, and the processed wheat flour has low processability, for which reason it is unpreferable as a method of processing wheat flour of the present invention.

Generally, wheat flour contains 12 to 14 wt. %. The water content provided in the present invention includes the water in wheat flour. Additionally, as for ethyl alcohol, in case that aqueous ethyl alcohol is used, the water in the aqueous ethyl alcohol is also included.

Next, the dispersed object wherein wheat flour and ethyl alcohol are homogeneously dispersed as mentioned above is followed by evaporation of ethyl alcohol therefrom at ≤50° C., and more preferably at 40 to 50° C. If ethyl alcohol is evaporated at >50° C., gluten in wheat flour is deactivated and secondary processability of wheat flour is lost, for which it is unpreferable.

A method of evaporating ethyl alcohol may appropriately be selected from, for example, a method of draft drying wherein dry air is blown into a batch-type chamber and the subject wherein ethyl alcohol is dispersed is convected thereby ethyl alcohol is evaporated, and a method of evaporating wherein the subject is spread on a temperature-modulated steel band. A use of a reduced pressure drying apparatus wherein ethyl alcohol evaporated and under the reduced pressure of preferably ≤20 kPa and more preferably ≤10 kPa thereby wheat flour is dried enables elimination of ethyl alcohol at lower temperature and more rapidly, for which reason it is preferable.

The processed wheat flour wherein ethyl alcohol is evaporated becomes powdery if ethyl alcohol is fully eliminated. However, in case that the flour is caked, about 30-mesh sifter may be used to make it homogeneous powdery. When ethyl alcohol is evaporated, wheat flour is again formed in a powdery state suitable for processing to be in a nature suitable for various secondary processing.

In the processed wheat flour of the present invention obtained by the method of the present invention mentioned above, without detriment to secondary processability of wheat gluten, flour-specific unpreferable palate feelings such as poor meltability may greatly be improved and flavor may also be improved.

Further, in case that wheat flour is processed by the method for processing of the present invention, not only the palate feelings of the food made therefrom may be improved but also the whole grain flour-specific unfavorable bitterness and odor may be removed and flavor may also predominantly be improved.

Processed wheat flour in the present invention may be the substitution of a part or whole of the conventional wheat flour to be used for breads, noodles, cookies, biscuits, crackers, cakes, pies, pretzels, snacks and the like. The quality of the products made from the above mentioned wheat flour is excellent in palate feelings such as feelings on the tongue, meltability, throat feelings and the like. Further, the quality is excellent since wheat flour-specific flour smell is completely removed.

EXAMPLES

Detailed description with embodiments and comparative examples will follow. The present invention, however, is not limited to them.

Wheat flour (soft wheat flour), whole grain wheat flour and buckwheat flour as a reference are respectively being agitated in an upright mixer, thereto aqueous ethyl alcohol is sprayed and dispersed so that the conditions of [Embodiments 1 to 8] and [Comparative examples 1 to 6] in the below mentioned Table 1 are satisfied. Then, the flours are dried by a reduced pressure drying apparatus and put through 30-mesh sifter, thereby 14 kinds of processed flours are obtained, 2 pts·wt. of salt and 45 pts·wt. of water are added to 100 pts·wt. of the processed flour obtained to be mixed in an upright mixer for 15 minutes for making dough, thereby secondary processability of the 14 kinds of processed flour are verified. The results of the secondary processability are shown in Table 1.

TABLE 1

| | Used flour | Amount of ethyl alcohol (to 100 pts. wt. of used flour) | Evaporation temperature (° C.) | Water (total) | Degree of reduced pressure (kPa) | Remarks | Disintegration | Secondary processability |
|---|---|---|---|---|---|---|---|---|
| Embodiment 1 | Wheat flour | 35 pts. wt. | 49° C. | 12.20% | 6.0 kPa | | ◎ | ◎ |
| Embodiment 2 | Wheat flour | 10 pts. wt. | 20° C. | 13.40% | 2.6 kPa | | ○ | ○ |
| Embodiment 3 | Wheat flour | 20 pts. wt. | 30° C. | 15.80% | 21.3 kPa | | ○ | ○ |
| Embodiment 4 | Wheat flour | 30 pts. wt. | 40° C. | 19.70% | 6.0 kPa | | ○ | ○ |
| Embodiment 5 | Wheat flour | 40 pts. wt. | 50° C. | 17.60% | 12.3 kPa | | ○ | ○ |
| Embodiment 6 | Wheat flour | 50 pts. wt. | 40° C. | 15.60% | 4.0 kPa | | ○ | ○ |
| Embodiment 7 | | 35 pts. wt. | 49° C. | 10.80% | 6.0 kPa | | ◎ | ◎ |
| Embodiment 8 | Wheat flour | 35 pts. wt. | 49° C. | 12.20% | 101.3 kPa (normal pressure) | A long time is required for alcohol elimination | ◎ | ◎ |
| Comparative example 1 | Wheat flour | 35 pts. wt. | 55° C. | 12.20% | 6.0 kPa | Gluten is Deactivated | ○ | X |
| Comparative example 2 | Wheat flour | 35 pts. wt. | 49° C. | 22.50% | 6.0 kPa | A lump of dough is formed. | X | X |
| Comparative example 3 | Wheat flour | 5 pts. wt. | 49° C. | 13.70% | 6.0 kPa | | ◎ | ◎ |
| Comparative example 4 | Whole grain wheat flour | 5 pts. wt. | 49° C. | 11.80% | 6.0 kPa | | ◎ | ◎ |
| Comparative example 5 | Wheat flour | 60 pts. wt. | 49° C. | 11.50% | 6.0 kPa | Alcohol is too much and handling is bad. A lump of dough is formed. | X | X |
| Comparative example 6 | Buckwheat flour | 35 pts. wt. | 49° C. | 11.90% | 6.0 kPa | | ◎ | ◎ |

Standard of evaluation: ◎ means excellent, ○ means good, Δ means average and X means bad.
※ Water: wheat flour - 14%, whole grain wheat flour - 12%, buckwheat flour - 13.5%
95% ethyl alcohol (v/v) = 92.43% ethyl alcohol (w/w)

As a result, as for disintegration of wheat flour, in [Comparative example 2] wherein water content is high and in [Comparative example 5] wherein ethyl alcohol content is high, a lump of dough is formed and disintegration may not be performed. Further, the dough made from the processed wheat flour processed in [Comparative example 1] wherein evaporation temperature of ethyl alcohol is 55° C. is not sticky enough to be formed properly.

Next, the ingredient consisting of 100 pts·wt. of each one of the processed flours processed under each condition of [Embodiments 1 to 8] and [Comparative examples 1 to 6] in [Table 1] and additionally unprocessed wheat flour and unprocessed whole grain wheat flour as [Comparative examples 7 to 8], 25 pts·wt. of sugar, 15 pts·wt. of margarine, 5 pts·wt. of whole fat milk powder, 1 pts·wt. of salt, 0.5 pts·wt. of sodium bicarbonate, 2 pts·wt. of ammonium bicarbonate, 0.1 pts·wt. of vanilla flavor, 26 pts·wt. of water is, in the usual manner, mixed, agitated and fermented, thereby dough of hard biscuit is made. Next, the dough is laminated in 12 layers to be formed with dough thickness of 1.8 mm, diameter of 50 mm and pin holes of 10, and baked in top and bottom fires of 180° C. oven for 9 minutes, thereby each hard biscuit is made. A sensory inspections of the biscuits are performed by ten panelists, the results thereof are shown in [Table 2].

In addition, it is unable to make biscuit dough from the processed wheat flours processed in [Comparative examples 1, 2 and 5], and therefore it is unable to make biscuits.

The sensory inspections were performed by the below mentioned standard of 5 stages.
Standard of evaluation by panelists:
5 . . . Excellent
4 . . . Good
3 . . . Average (based on the unprocessed wheat flour)
2 . . . Bad
1 . . . Horrible

TABLE 2

| Conditions | | Results | | |
|---|---|---|---|---|
| Processed flour | Remarks | Sensory evaluation of the biscuits | Grade average by the 10 panelists (5 stage assessment) | Other comments |
| 1 Processed wheat flour of [Embodiment 1] | | ◎ | 4.7 | |
| 2 Processed wheat flour of [Embodiment 2] | | ○ | 4.1 | |
| 3 Processed wheat flour of [Embodiment 3] | | ○ | 4.2 | |
| 4 Processed wheat flour of [Embodiment 4] | | ○ | 4.2 | |
| 5 Processed wheat flour of [Embodiment 5] | | ○ | 4.1 | |
| 6 Processed wheat flour of [Embodiment 6] | | ○ | 4.4 | |
| 7 Processed whole grain wheat flour of [Embodiment 7] | | ◎ | 4.6 | Cereal odor is reduced. |
| 8 Processed wheat flour of [Embodiment 8] | | ◎ | 4.6 | |
| 9 Processed wheat flour of [Comparative example 1] | Gluten is Deactivated. | — | | Dough may not be made. |
| 10 Processed wheat flour of [Comparative example 2] | A lump of dough is formed. | — | | Dough may not be made. |
| 11 Processed wheat flour of [Comparative example 3] | | Δ | 3.1 | The same as the unprocessed wheat flour. |
| 12 Processed whole grain wheat flour of [Comparative example 4] | | X | 1.5 | Extraordinary cereal odor (the same as the unprocessed whole grain flour). |
| 13 Processed wheat flour of [Comparative example 5] | A lump of dough is formed. | — | | Dough may not be made. |
| 14 Processed buckwheat flour of [Comparative example 6] | | X | 1.7 | Buckwheat taste is lost. |
| 15 Not processed wheat flour of [Comparative example 7] | | Δ | 3.0 | |
| 16 Not processed whole grain flour of [Comparative example 8] | | X | 1.4 | Extraordinary cereal odor. |

In the table, ◎ means excellent (≥4.5), ○ means good (from 4.0 to <4.5), Δ means average (from 3.0 to <4.0), X means bad (<3.0) and — means N/A (biscuit dough may not be formed).

Consequently, the biscuits in the present invention made from the processed wheat flour processed in [Embodiments 1 to 8], are very delicious having good palate feelings wherein powdery feelings and poor meltability are reduced. Particularly, the biscuits made from the whole grain wheat flour processed in [Embodiment 7], compared to the biscuit made from the unprocessed whole grain wheat flour, are very delicious wherein whole grain flour-specific extraordinary cereal odor is predominantly improved.

The biscuits made from the processed wheat flours processed in Comparative Example 3 and [Comparative example 4] as comparative examples of the present invention, as well as the biscuit made from the unprocessed wheat flour, have powdery feelings and poor meltability. The biscuit made from the buckwheat flour processed in [Comparative example 6] has poor buckwheat taste.

The Ninth Embodiment 100 pts·wt. of soft wheat flour is being agitated at low speed in a mixer, thereto 37.9 pts·wt. of 95% ethyl alcohol (v/v) is sprayed and agitated to be the flour wherein ethyl alcohol is homogeneously dispersed and 12.2% of water is contained.

Next, a reduced pressure drying apparatus is set to 49° C., wherein the flour is dried under the reduced pressure of 6.0 kPa for 4 hours, thereby the processed wheat flour wherein ethyl alcohol is evaporated is made.

Subsequently, the ingredient consisting of 100 pts·wt. of the processed wheat flour, 30 pts·wt. of sugar, 38 pts·wt. of margarine, 5 pts·wt. of whole fat milk powder, 5 pts·wt. of whole egg, 0.5 pts·wt. of salt, 1 pts·wt. of sodium bicarbonate, 1 pts·wt. of ammonium bicarbonate, 0.2 pts·wt. of vanilla flavor, 10 pts·wt. of water is, in the usual manner, mixed and agitated, thereby dough of cookie is made.

The dough is formed in a cylinder shape with diameter of 47 mm and thickness of 5 mm by a rotary molder and baked in top and bottom fires of 180° C. oven for 8 minutes, thereby baked confectionery is made. The baked confectionery is, compared to the ordinary cookie which is not made from the processed wheat flour, very delicious having good palate feelings wherein powdery feelings and poor meltability are reduced.

Further embodiments and comparative examples are exemplified below,

The Tenth Embodiment

Wheat Noodles 100 pts·wt. of medium wheat flour is being agitated at low speed in a mixer, thereto 61.1 pts·wt. of 87% ethyl alcohol (v/v) is sprayed and agitated to be the flour wherein ethyl alcohol is homogeneously dispersed and 15.6% of water is contained.

Next, a reduced pressure drying apparatus is set to 40° C., wherein the flour is dried during mixed under the reduced pressure of 4.0 kPa for 2 hours, thereby the processed wheat flour wherein ethyl alcohol is evaporated is made.

Subsequently, the ingredient consisting of 100 pts·wt. of the processed wheat flour, 45 pts·wt. of salt and 440 pts·wt. of water is, in the usual manner, mixed and agitated, thereby dough of wheat noodle is made.

Next, the dough is formed in a sheet shape with thickness of 3.5 mm by a reverse sheeter, and then noodle with width of 3.5 mm is made by a noodle machine. The noodle is boiled for 13 minutes and firmed up by ice water, thereby wheat noodle is made. The wheat noodle is, compared to the ordinary wheat noodle which is not made from the processed wheat flour, very delicious having good palate feelings wherein powdery feelings and poor meltability are reduced.

The Eleventh Embodiment

Breads 100 pts·wt. of whole grain wheat flour is being agitated at low speed in a mixer, thereto 37.9 pts·wt. of 95% ethyl alcohol (v/v) is sprayed and agitated to be the flour wherein ethyl alcohol is homogeneously dispersed and 10.8% of water is contained.

Next, a reduced pressure drying apparatus is set to 49° C., wherein the flour is dried under the reduced pressure of 6.0 kPa for 4 hours, thereby the processed whole grain wheat flour wherein ethyl alcohol is evaporated is made.

Subsequently, the ingredient consisting of 100 pts·wt. of the processed whole grain wheat flour, 1.5 pts·wt. of yeast, 0.1 pts·wt. of yeast food, 5 pts·wt. of margarine, 2 pts·wt. of sugar, 1.7 pts·wt. of salt and 60 pts·wt. of water is, in the usual manner, mixed, agitated and fermented, thereby dough of bread is made.

The dough is divided into 80 g each, formed by hand and secondary fermented at a temperature of 38° C. and a humidity of 85% for 1 hour, and then baked in top and bottom fires of 200° C. oven for 19 minutes, thereby prepared whole grain flour bread is made. The bread is, compared to the ordinary whole grain flour bread which is not made from the processed whole grain flour, very delicious having good palate feelings wherein powdery feelings and poor meltability are reduced and further whole grain flour-specific unpleasant cereal odor is absent.

Comparative Example 9

Pretzels 100 pts·wt. of hard wheat flour is being agitated at low speed in a mixer, thereto 37.9 pts·wt. of 95% ethyl alcohol (v/v) is sprayed and agitated to be the flour wherein ethyl alcohol is homogeneously dispersed and 12.2% of water is contained.

Next, a reduced pressure drying apparatus is set to 55° C., wherein the flour is dried under the reduced pressure of 6.0 kPa for 3 hours and 30 minutes, thereby the processed wheat flour wherein alcohol is evaporated is made.

Subsequently, the ingredient consisting of 90 pts·wt. of the processed wheat flour, 10 pts·wt. of soft wheat flour, 25 pts·wt. of starch, 15 pts·wt. of shortening, 2 pts·wt. of salt, 3 pts·wt. of sodium bicarbonate, 2 pts·wt. of dry yeast and 25 pts·wt. of water is, in the usual manner, mixed and agitated, thereby dough of pretzel is tried to be made. However, unlike in the case of the ordinary hard wheat flour is used, appropriate dough may not be made properly since it is not sticky and readily disintegrating.

Comparative Example 10

100 pts·wt. of soft wheat flour is being agitated at low speed in a mixer, thereto 56 pts·wt. of 70% ethyl alcohol (v/v) is sprayed and agitated. The water content thereof is high or 22.5%, for which reason gluten is bound and many lumps of dough are made. Thus, the desired homogeneous state may not be implemented.

A reduced pressure drying apparatus is set to 49° C., wherein the flour is dried under the reduced pressure of 6.0 kPa for 4 hours. However, the lumps of dough still exist after dried as hard as before. Thus, the flour may not be made.

Comparative Example 11

Biscuits 100 pts·wt. of soft wheat flour is being agitated at low speed in a mixer, thereto 5.4 pts·wt. of 95% ethyl alcohol (v/v) is sprayed and agitated to be the flour wherein ethyl alcohol is homogeneously dispersed and 13.7% of water is contained.

Next, a reduced pressure drying apparatus is set to 49° C., wherein the flour is dried under the reduced pressure of 6.0 kPa for 3 hours, thereby the processed wheat flour wherein alcohol is evaporated is made.

Subsequently, the ingredient consisting of 100 pts·wt. of the processed wheat flour, 25 pts·wt. of sugar, 40 pts·wt. of margarine, 5 pts·wt. of whole fat milk powder, 5 pts·wt. of whole egg, 0.5 pts·wt. of salt, 1 pts·wt. of sodium bicarbonate, 1 pts·wt. of ammonium bicarbonate, 0.2 pts·wt. of vanilla flavor, 10 pts·wt. of water is, in the usual manner, mixed and agitated, thereby dough of biscuit is made.

Next, the dough is formed in a cylinder shape with diameter of 47 mm and thickness of 5 mm by a rotary molder and baked in top and bottom fires of 180° C. oven for 8 minutes, thereby baked confectionery is made. The baked confectionery is, almost the same as the ordinary biscuit which is not made from the processed wheat flour, an ordinary biscuit.

Comparative Example 12

Buckwheat Noodles 100 pts·wt. of buckwheat flour is being agitated at low speed in a mixer, thereto 37.9 pts·wt. of 95% ethyl alcohol (v/v) is sprayed and agitated to be the flour wherein ethyl alcohol is homogeneously dispersed and 11.9% of water is contained.

Next, a reduced pressure drying apparatus is set to 49° C., wherein the flour is dried under the reduced pressure of 6.0 kPa for 4 hours, thereby the processed buckwheat flour wherein ethyl alcohol is evaporated is made.

Subsequently, the ingredient consisting of 100 pts·wt. of the processed buckwheat flour, 25 pts·wt. of medium wheat flour 50 pts·wt. of water is, in the usual manner, kneaded, thereby dough of buckwheat is made.

The dough is rolled to the thickness of 2 mm by a rolling pin and cut into the appropriate width, thereby the buckwheat noodle is made. The buckwheat noodle is boiled in boiling water and washed with running water, thereby the buckwheat noodle is made. The buckwheat noodle is, compared to the ordinary buckwheat noodle which is not made from the processed buckwheat flour, tasteless with poor buckwheat taste.

What is claimed is:

1. A method of processing wheat flour comprising:
   homogeneously dispersing about 10 to about 55 pts·wt. of ethyl alcohol or ethyl alcohol excluding water if aqueous ethyl alcohol is used in 100 pts·wt. of whole grain flour to create a mixture, the mixture having a total water content that is about ≤20 wt. %; and
   subjecting the mixture to an active evaporating process that operates at a temperature greater than about 20° C. and less than about 50° C. to substantially evaporate the ethyl alcohol in the mixture such that the wheat flour becomes powdery.

2. The method of processing wheat flour as claimed in claim 1, wherein evaporation of ethyl alcohol is carried out under reduced pressure with respect to atmospheric pressure.

3. The method of processing wheat flour as claimed in claim 1, wherein wheat flour consists of whole grain flour.

4. The method of processing wheat flour as claimed in claim 1, wherein the active evaporating process comprises one of a draft drying process, a reduced pressure drying process, or a temperature modulated band process.

5. A method of processing wheat flour comprising:
   homogeneously dispersing about 10 to about 55 pts·wt. of ethyl alcohol or ethyl alcohol excluding water if aqueous ethyl alcohol is used in 100 pts·wt. of wheat flour to create a mixture, the mixture having a total water content that is about ≤13 wt. %; and
   subjecting the mixture to an active evaporating process that operates at a temperature greater than about 20° C. and less than about 50° C. to substantially evaporate the ethyl alcohol in the mixture such that the wheat flour becomes powdery.

6. A method of processing wheat flour comprising:
   homogeneously dispersing about 10 to about 55 pts·wt. of ethyl alcohol or ethyl alcohol excluding water if aqueous ethyl alcohol is used in 100 pts·wt. of wheat flour to create a mixture, the mixture having a total water content that is between 10 and 13 wt. %; and
   subjecting the mixture to an active evaporating process that operates at a temperature greater than about 20° C. and less than about 50° C. to substantially evaporate the ethyl alcohol in the mixture such that the wheat flour becomes powdery.

\* \* \* \* \*